(12) United States Patent
Potapov et al.

(10) Patent No.: US 8,296,517 B2
(45) Date of Patent: Oct. 23, 2012

(54) DATABASE OPERATION-AWARE STRIPING TECHNIQUE

(75) Inventors: Dmitry Potapov, Emeral Hills, CA (US); Cetin Ozbutun, Atherton, CA (US); Juan Loaiza, Woodside, CA (US); Kirk Bradley, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 247 days.

(21) Appl. No.: 12/859,184

(22) Filed: Aug. 18, 2010

(65) Prior Publication Data

US 2011/0047330 A1 Feb. 24, 2011

Related U.S. Application Data

(60) Provisional application No. 61/235,325, filed on Aug. 19, 2009.

(51) Int. Cl.
*G06F 12/00* (2006.01)
(52) U.S. Cl. ........ 711/114; 707/810; 711/165; 711/203; 714/6.22
(58) Field of Classification Search .................. 711/114, 711/165, 203; 714/6.22; 707/810
See application file for complete search history.

(56) References Cited

U.S. PATENT DOCUMENTS

| | | | | |
|---|---|---|---|---|
| 5,303,244 A | * | 4/1994 | Watson | 714/5.1 |
| 5,809,224 A | * | 9/1998 | Schultz et al. | 714/6.32 |
| 6,058,489 A | * | 5/2000 | Schultz et al. | 714/6.32 |
| 6,675,318 B1 | * | 1/2004 | Lee | 714/6.21 |
| 2005/0166083 A1 | * | 7/2005 | Frey et al. | 714/6 |
| 2006/0085593 A1 | * | 4/2006 | Lubbers et al. | 711/114 |

FOREIGN PATENT DOCUMENTS

| | | |
|---|---|---|
| EP | 0 518 575 A1 | 12/1992 |
| WO | WO 2009/000186 A1 | 12/2008 |

OTHER PUBLICATIONS

"Open NAND Flash Interface Specification", ONFi Open Nand Flash Interference, Revision 2.1, Jan. 14, 2009, pp. 1-206.
"Open NAND Flash Interface Specification", ONFi Open Nand Flash Interference, Revision 2.3, Aug. 25, 2010, pp. 1-220.
"Open NAND Flash Interface Specification", ONFi Open Nand Flash Interference, Revision 2.2, Oct. 7, 2009, pp. 1-216.
"Open NAND Flash Interface Specification", ONFi Open Nand Flash Interference, Revision 2.0, Feb. 27, 2008, pp. 1-174.

* cited by examiner

*Primary Examiner* — Jae Yu
(74) *Attorney, Agent, or Firm* — Hickman Palermo Truong Becker Bingham Wong LLP; Eric L. Sutton

(57) ABSTRACT

A method, device, and computer readable medium for striping rows of data across logical units of storage with an affinity for columns is provided. Alternately, a method, device, and computer readable medium for striping columns of data across logical units of storage with an affinity for rows is provided. When data of a logical slice is requested, a mapping may provide information for determining which logical unit is likely to store the logical slice. In one embodiment, data is retrieved from logical units that are predicted to store the logical slice. In another embodiment, data is retrieved from several logical units, and the data not mapped to the logical unit is removed from the retrieved data.

20 Claims, 4 Drawing Sheets

DATABASE OPERATION-AWARE STRIPING TECHNIQUE

CROSS-REFERENCE TO RELATED APPLICATIONS; BENEFIT CLAIM

This application claims benefit of Provisional Application. 61/235,325, filed Aug. 19, 2009, the entire contents of which is hereby incorporated by reference as if fully set forth herein, under 35 U.S.C. §119(e).

FIELD OF THE INVENTION

The present invention relates to database management, and more particularly to a system and method for storing data in physical memory.

BACKGROUND

Table data is conventionally viewed both pictorially and conceptually as being two dimensional. For example, the sample table below contains data related to a plurality of employees.

| Employee ID | Name | Salary | Department |
| --- | --- | --- | --- |
| 1234 | John | 75000 | Finance |
| 1235 | Tom | 65000 | Finance |
| 1236 | Kate | 85000 | Legal |

When stored in a computer memory, however, this data will be stored as a one-dimensional string of values. A first technique for storing the values of the table is referred to as a row-major orientation, which stores all the values for a first row and then stores the values for the next row—e.g. " . . . 1234; John; 75000; Finance; 1235; Tom; 65000; Finance; 1236; Kate; 85000; Legal . . ." A second technique for storing the values of the table is referred to as column-major orientation, which stores all the values for a first column and then stores the values for a second column—" . . . 1234; 1235; 1236; John; Tom; Kate; 75000; 65000; 85000; Finance; Finance; Legal . . . " In other words, data from a table may be stored in a storage format that is either the column type (i.e.; column major) or the row type (i.e., row major).

When retrieving stored data, data is moved from a permanent memory such as a hard disk drive to a short term memory such as a cache in units of blocks, where a block may be a fixed size such as 32K. When retrieving data that is stored sequentially in the permanent memory, the number of blocks that needs to be transferred to short term memory is minimized. For example, if the table above is stored in a row major format, then retrieving the record for employee 1234 comprises retrieving data that is stored sequentially on the permanent memory (i.e., "1234; John; 75000; Finance"). Accordingly, that data is likely to all be contained with one block or to only span a few blocks. If, however, a function to calculate an average salary were executed on the data stored in a row-major format, the function would have to retrieve all the salaries stored in the table, which are not stored sequentially, thus necessitating the transfer of many more blocks of a data to short term memory than retrieving the employee record required.

If the table above is stored in a column-major format, then the scenario is reversed. The salary data is stored sequentially ("75000; 65000; 85000"), and determining an average salary will only require transferring a few blocks of data to the short term memory. The complete record for an employee, however, will not be stored sequentially, thus requiring the transfer of many blocks of data.

Transferring numerous blocks of data is more time consuming and more resource intensive than transferring only a few blocks of data. Accordingly, the average salary operation described above would be completed more quickly and with fewer system resources on the data stored in a column-major format, but the retrieval of an employee record would be executed more quickly and with fewer system resources on the data stored in row-major format. A database designer can choose the preferable storage technique based on the types of operations that will be performed most frequently, but neither format will be able to efficiently execute all types of operations. Accordingly, there exists in the art a need for a data storage technique that combines the benefits of both column major and row major storage techniques.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and storage device for striping row major data across logical units of storage (also referred to herein as "LUNs") with an affinity for columnar slices is provided. Alternately, a method and storage device for striping column major data across logical units of storage with an affinity for row slices is provided. When data of a columnar slice is requested by a host device to a storage device, a memory controller in the storage device uses mapping logic to determine which logical unit is likely to store the columnar slice. In one embodiment that reduces data I/O ("input and/or output") between the memory controller and storage chips, data is retrieved from logical units that are predicted to store the columnar slice. In another embodiment that reduces I/O between the memory controller and the host device, data is retrieved from several logical units, and the data that is not in the columnar slice is removed from the retrieved data.

The mapping logic may be used by the controller to store and retrieve the data, and the mapping logic may include any hardware or programmed software mapping that maps a columnar slice to a logical unit. In one embodiment, the mapping logic is data block-specific. In other words, different mappings may be provided for different data blocks. In one example, the mapping is stored on a logical unit that stores the block header for the block, and the memory controller retrieves the mapping from the logical unit. In one embodiment, the memory controller uses a default mapping, implemented in memory or in hardware on the memory controller, of a columnar slice to a logical unit. The memory controller uses the default mapping to determine that data should be retrieved in parallel from the logical unit that stores the columnar slice by default and the logical unit storing the block header by default. In this embodiment, the block header provides additional, corrective mapping information, such as the relative sizes of the columnar slices, that is used to determine whether parts of the requested columnar slice are stored on other logical units. If the default logical unit contained the entire columnar slice, then no further data retrieval is performed to satisfy the request.

Flash Storage Devices

Figure 1:
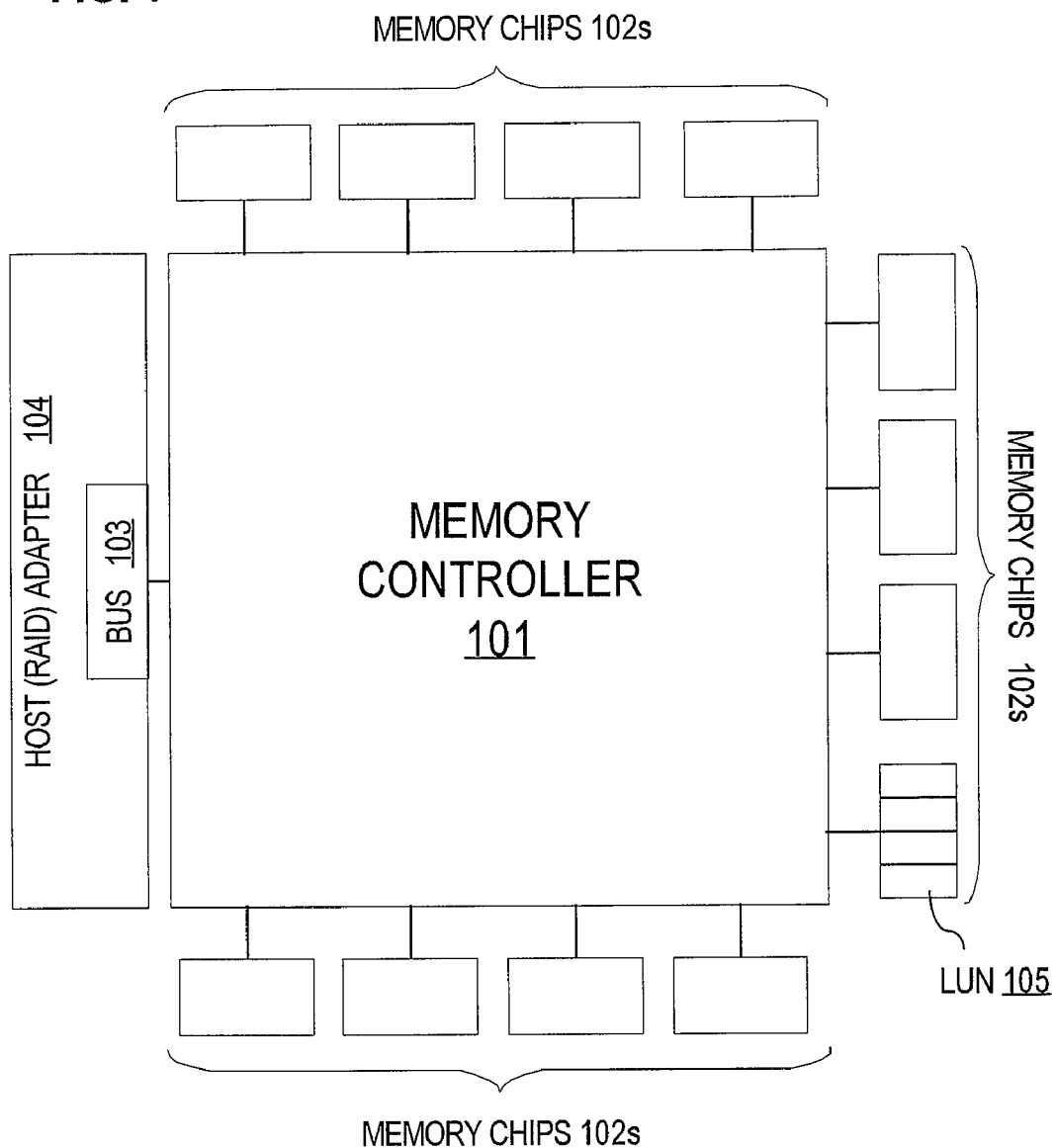
FIG. 1 illustrates an example flash memory module.

In an example non-volatile (NV) storage drive system such as flash, multiple NV memory chips store data. As an example, FIG. 1 shows a schematic of an example flash drive. The flash drive comprises a flash memory controller 101 and multiple flash memory chips 102s. Multiple flash memory chips 102s can be used to achieve higher storage capacity per drive.

In the example of FIG. 1, the flash memory controller 101 is connected to a HOST system adapter 104 via a bus 103. The bus might, for example, be a high speed serial bus with a differential interface such as SAS or SATA. High speed serial cabling can simplify storage box wiring, provide better air flow within storage enclosures due to thinner wires, have more compact PCB footprint, and avoid cross-talk between parallel wires. The HOST system is a computing device such as a PC ("personal computer") that is configured to use the HOST system adapter 104 to send instructions to flash memory controller 101 for storage and retrieval of data on a flash memory device that includes flash memory controller 101 and storage chips 102s.

Logical Units of Storage

In one embodiment, internal flash chip hierarchy (see, e.g. FIG. 3) partitions flash chips into a variable number of fully parallel LUNs (Logical Unit Numbers) 301s. All LUNs share one bus, connecting flash chip to flash controller. In another embodiment, each logical storage unit corresponds to a different physical storage unit such as a flash chip. In one embodiment, each LUN is further subdivided into a variable number of "Interleaves" 303s, also capable of parallel operation (with certain restrictions. For example, ONFi 2.0 currently does not define interleaved reads). This flexibility in the internal flash chip hierarchy further increases the variability in flash characteristics.

Figure 3:
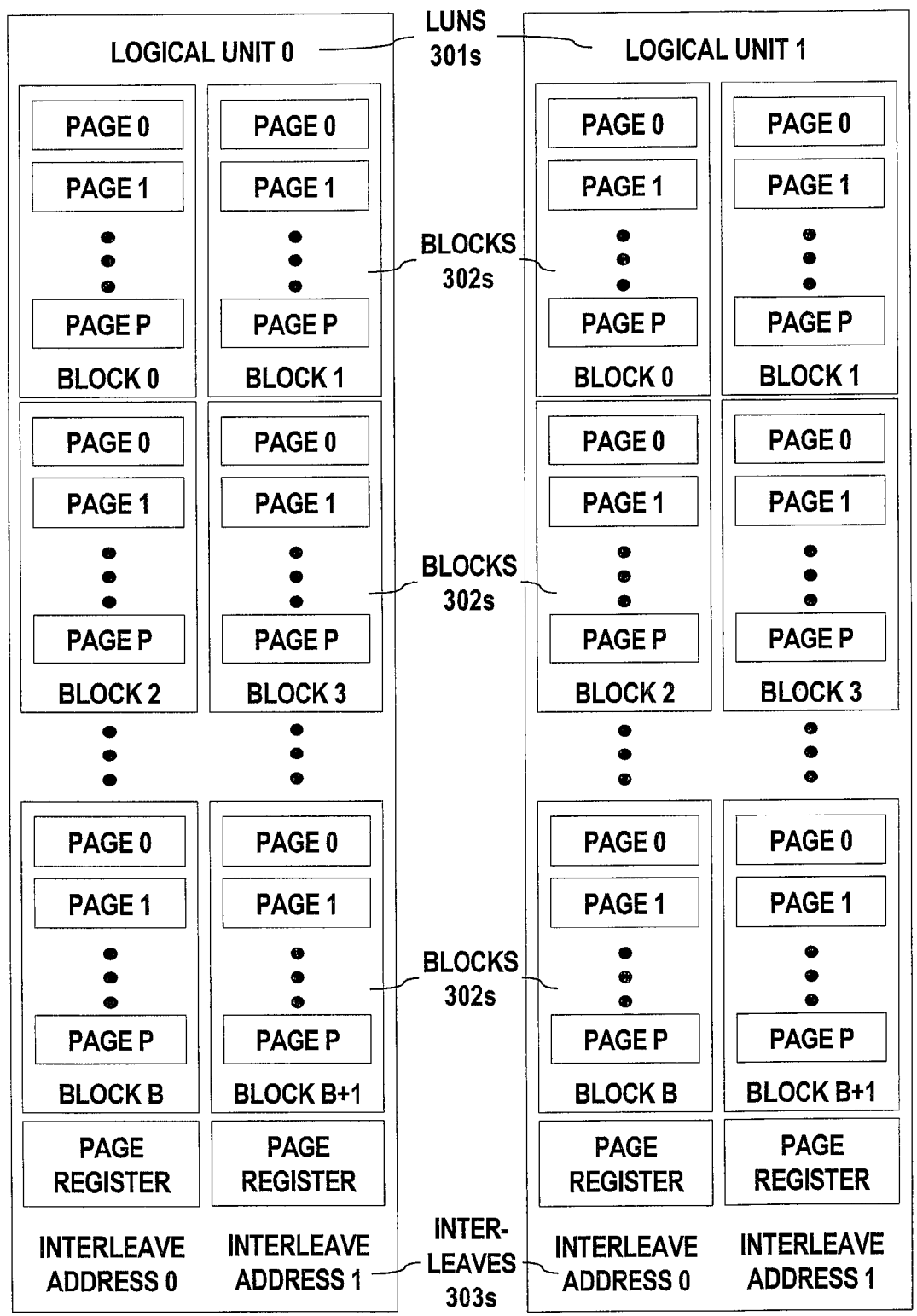
FIG. 3 illustrates an example of an internal flash chip hierarchy.

FIG. 3 shows an example of a Target memory organization. In this case, there are two logical units where each logical unit supports two-way interleaved addresses. A device contains one or more targets. A target is controlled by one CE# signal. A target is organized into one or more logical units (LUNs). A logical unit (LUN) is the minimum unit that can independently execute commands and report status. Specifically, separate LUNs may operate on arbitrary command sequences in parallel. For example, it is permissible to start a Page Program operation on LUN 0 and then prior to the operation's completion to start a Read command on LUN 1. In one embodiment, a LUN contains at least one page register and a Flash array. In one embodiment, the number of page registers is dependent on the number of interleaved operations supported for that LUN. In one embodiment, the Flash array contains a number of blocks.

Parallel Interfaces for Flash Drives

Many parallel interfaces for flash drives do not provide significant performance advantages over high speed serial interfaces. For example, ONFi (Open NAND Flash Interface group) defines a new parallel connector for flash systems, which has no significant advantages over the current generation 3 Gbps SATA, and is in fact slower than next generation 6 Gbps SATA. Legacy ONFi interfaces are rated at 40 MB/s, with first generation rated at about 133 MB/s, second generation rated at about 266 MB/s, and third generation rated at about 400 MB/s. The primary goal for having a new parallel ONFi connector standard, therefore, appears to be standardization for a mass consumer (notebook or desktop) PC and not a new or faster storage system interface.

Figure 2A:
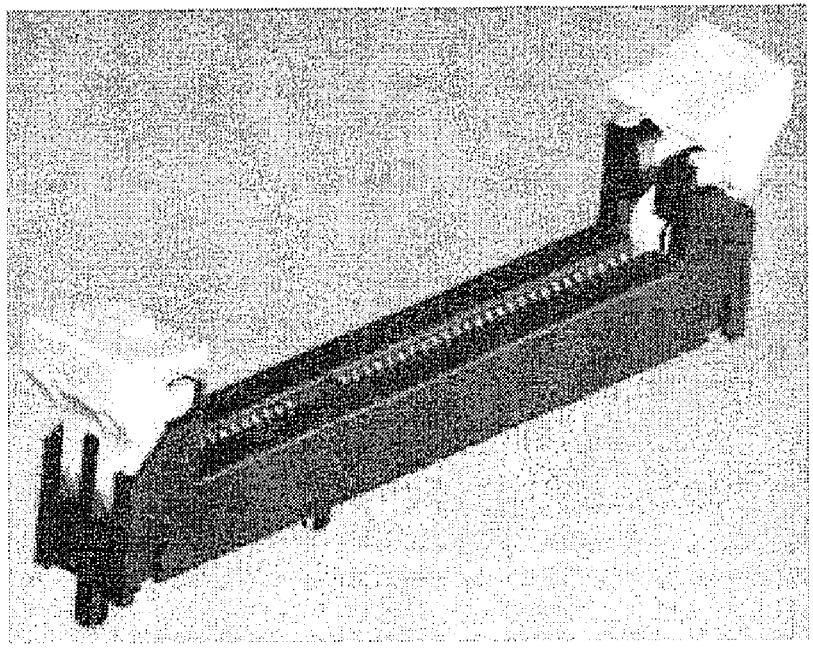
FIG. 2A and FIG. 2B illustrate example Open NAND Flash Interface group connectors.
Figure 2B:
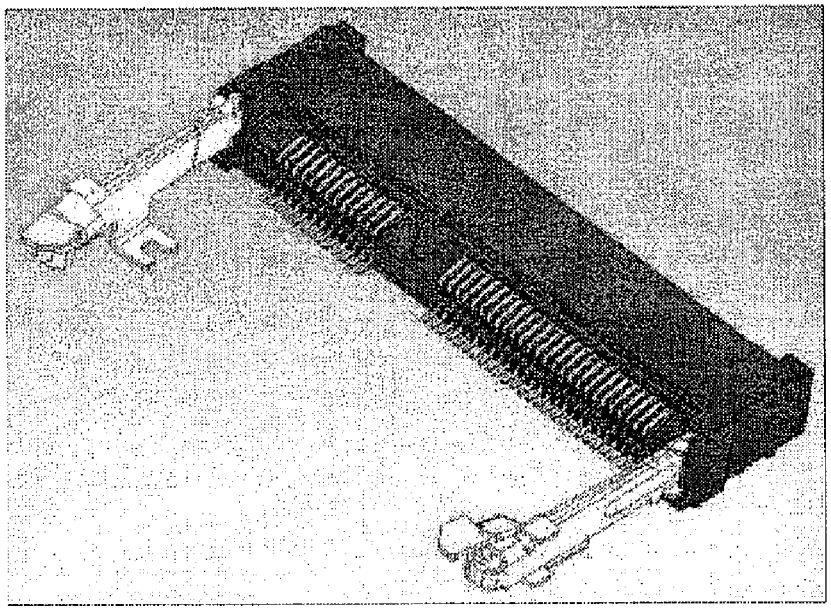

Example ONFi connectors are illustrated in FIGS. 2A and 2B. The ONFi connector leverages existing memory connectors, avoids major tooling costs, re-uses electrical verification, and ensures low cost and fast TTM ("time to market"). The ONFi connector and module are key building blocks for pervasive use of NAND in PC platforms. The ONFi 2.0 source synchronous data interface is scalable, backwards compatible, and has no DLL on the NAND device.

For as long as parallel interfaces do not significantly outperform high speed serial interfaces (to a point where all bandwidth bottlenecks in the flash drive-to-HOST adapter bus are eliminated), the difference between serial and parallel interfaces is not relevant for the purposes of this disclosure. An exemplary storage interface is comparable to this generation 3 Gbps or next generation 6 Gbps SATA/SAS.

Data Striping

To achieve high bandwidth between disks and HOST systems, storage arrays traditionally employ striping techniques, where logically contiguous chunks of data are divided across multiple disks. For host applications reading data in sufficiently large units, combined disk bandwidth is available. However, the combined disk bandwidth may be restricted by bottlenecks in storage pipes ("storage bus"), host controller logic, host memory bus, etc.

Similar to storage arrays, flash drive systems with multiple memory chips may employ data striping to divide logically contiguous chunks of application data across multiple memory chips, providing increased HOST-to-flash memory bandwidth to applications running on the HOST system.

Different data striping approaches can result in dramatically different performance characteristics for a given HW flash drive configuration (i.e., a flash drive with hardware-based encryption), where the number and type of memory chips, internal on-the-drive bus and external storage bus are fixed.

Striping on Flash Devices

The same data striping approach can result in dramatically different performance characteristics on different HW flash drive systems. Therefore, data striping in flash drives is typically flash technology/vendor dependent.

For example, in the ONFi 2.0 specification for raw interfaces to NAND memory chips, external chip packaging and internal flash chip hierarchy, five different flash chip packages are defined (TSOP-48, WSOP-48, LGA-52, BGA-63 and BGA-100) and pinouts are fixed for interoperability across chip vendors. Data bus width is flexible between 8 bit and 16 bit. There are 6 asynchronous timing modes and four source synchronous timing modes ranging from 20 Mhz to 66 Mhz. There is a provision for dividing one 16 bit bus into dual 8 buses as well, and a DDR (double data rate) mode in source-synchronous operation. These bus parameters alone can introduce >6× variability into the chip-to-controller bandwidth equations.

In contrast to ONFi, SD (secure digital) card specification defines an up to 6 wire external card bus (clock, command and 1-4 wire data bus), with variable timing of up to 50 Mhz, and maximal (i.e. timeout) values for various operations. Even though the SD specification is generally simpler than ONFi, SD card performance characteristics are typically less controllable and behavior is more unpredictable than ONFi compliant flash chip behavior.

Minimum Transfer Units

One trait that many flash chip standards or trends appear to share is that read transfers are done in multiples of minimum transfer units, (also referred to as, MTUs, sectors, blocks or pages). In one example, the minimum transfer unit length is 512 bytes. In other embodiments, the MTU length may be larger or smaller. Minimum transfer units can enable hiding of the "chattinness" of request-response bus protocols, and allow HOST applications, or applications running on the HOST system, to take advantage of locality of reference in data access. The same in fact applies even to DRAM-to-CPU memory interfaces. CPUs typically operate in cache line size transfers, for example 64-128 bytes per transfer.

Latency of MTU access (defined as the number of clock cycles between the end of read request command, and the first bits of MTU appearing on the data bus), is device, technology and package specific. The number of clock cycles required to send a read command to a flash chip may also be counted if, for example, the command bus is relatively narrow and the read request is relatively long. In some instances, commands are sufficiently short and the buses are sufficiently wide for the read command lengths to be insignificant in the overall MTU access latency. After the initial MTU access latency, the MTU is transferred at the full data bus speed.

Bottlenecks in Storage and Retrieval

Another common trait appears to be that external flash chip interface specifications (e.g. form factors, bus commands and bus timings) are not changed frequently. The specifications however tend to include explicit provisions for growing chip densities as well as variability in the degree of parallelism (LUNs) and "Interleaves." Customer demand for flash drive capacity increase can therefore be expected to result in bottlenecks in the on-the-drive buses, and/or in the drive-to-HOST buses because, for example, only a limited number of chips of a given form factor can fit into a typical 3.5" disk enclosure. A limit on the number of chips per drive translates into a limit on the number of chip-to-flash controller buses and combined chip-to-flash-controller bandwidth.

In database management systems, data is stored in tables, and tables are stored in data blocks such as blocks 302s in FIG. 3. A full table scan operation reads table blocks in sets of N contiguous data blocks at a time (e.g., 32K database block size and N=32 blocks in a set results in 1 MB sequential reads).

To take advantage of multiple chips (and multiple parallel LUNs, etc. within chips), 1 MB of contiguous (from the application's point of view) data may be striped across many parallel units in a flash drive.

There are many data format unaware (i.e. physical) data striping techniques. For example, given 64 parallel flash units, data can be striped by bit (e.g. first bit goes to first chip, second bit goes to second chip, . . . 64th bit goes to 64th chip, and then the pattern repeats), by byte, word, etc up to 16 k unit (in the 1 MB read, 64 chips configuration), or may not be striped at all.

A good physical data striping technique takes advantage of available parallelism within a flash drive, but does not reduce the amount of data that needs to be transferred from flash chips into the host system. If any of the buses that the data has to cross between flash chips and HOST CPUs is a bottleneck, increased parallelism does not result in performance improvement (or the potential performance benefit is only partially realized), and striping is ineffective (or has a partial effect only).

Striping Data with an Affinity for Slices of the Data

In database management systems, full table scans typically select a subset of database columns (with all columns selected being one possible subset). For a table with C columns, the number of possible subsets in full table scans is 2^C, only one of them being "all columns selected" case. For table scans selecting a subset of table columns, a subset of table data needs to be transferred from flash chips to HOST CPUs.

In one embodiment, a database block stored in row major format contains various block headers, table rows and row columns within the rows. Row major formats provide good locality of reference access properties and allow efficient table indexing, and column major formats have their own sets of trade-offs that are different from row major formats. For example, column major format is employed in several specialized research and commercial products, such as Oracle Express and other Oracle products. Either format may be employed according to the techniques described herein. In order to provide a clear and concise explanation of the techniques, an example is provided with reference to storing data in a row major format by striping the data with an affinity for columns. As used herein, the term "row" includes any slice of data that is perpendicular to a "column," and the term "column" includes any slice of data that is perpendicular to a "row." In other words, the term "row" may be substituted with the word "column," and vice versa, as long as they describe perpendicular slices of data. Accordingly, the examples described may be used to store data in column major format by striping the data with an affinity for rows or in row major format by striping the data with an affinity for columns.

In a row major format, data blocks storing table data contain both the columns that a given full table scan needs, as well as columns that are not needed for the given full table scan. Similarly, in a column major format, data blocks storing table data contain both the rows that a given full table scan needs, as well as the rows that are not needed for the given full table scan.

Technology-Independent Striping

Techniques of our approaches introduce a special representation of a data block in Row Store, where columns are affinitized to units of flash MTU (minimum transfer unit) size. In various embodiments, the techniques provide:

a) a very simple, flash technology/vendor-independent, implementation of SMART Scan projection in the flash controller. Smart scan projection done in the flash controller reduces number of MTUs that need to be transferred from flash controller to HOST CPUs, reducing requirements on all buses upwards of the flash controller; and/or b) a multitude of flash technology/vendor dependent SMART Scan optimizations, where only a subset of MTUs are transferred from flash chips to the flash controller, reducing requirements on local buses connecting flash chips to the flash controller, flash chips and the flash controller itself.

If a full table scan operation is bottlenecked on any of these resources, implementing various approaches discussed herein can result in performance improvements.

In one embodiment where data is stored in the row major format, the block is logically divided into a "block frame" and "column data." Column data is further divided into multiple columnar slices, one slice per column. The block frame contains various block headers (cache header, transaction header, etc). In one embodiment, a block header stored in the block frame includes mapping information that maps columns to logical units of storage. Columnar slices contain, "vertical" columnar slices (for example, a sequence of <length,value> pairs).

The logical columnar slices are mapped to a set of MTUs.

In one embodiment, to achieve a) above, the mapping is flash/vendor technology independent. For example, only MTU size may be taken into account to implement the mapping.

In one embodiment, to achieve b) above, the mapping is flash/vendor technology dependent. For example, both MTU size and the physical striping of data across multiple flash chips may be taken into account.

The mapping of one block to a known number of fixed length MTUs may be explained by a non-limiting example of a 32K table block for a 63 column table striping across 64 stripes 512 bytes each.

In the example, the striping process begins by calculating combined block frame space requirements and aggregate column slice requirements for all 63 columns. This is a set of 64 non-negative numbers, a sum of which is less than or equal to 32768 (32K). In the example, the sum is usually less than 32K because the blocks will typically have some amount of free space in them.

In the example, the 64 numbers are stored in the block frame slice. Optionally, 128 bytes for storing these 64 2-byte integers were reserved in the block at the data insertion time. In another embodiment, the extra space is available in the block because fully loaded blocks with 0 free bytes are rare. For example, 128 bytes are 0.4% of a 32K block, and this does not impose a significant storage overhead either way.

Continuing with the example, all 64 slices are then written sequentially, starting with the block frame, one following another, into the sequential 64 512 byte stripes, with an affinity/padding rule configured such that if starting the next slice on its primary stripe does not overflow 32K, then the next slice is aligned (padded) to its primary stripe. Otherwise, instead of padding the next slice to its primary stripe, the next slice may follow the previous slice. For example, the next slice may immediately follow the previous slice on the next stripe.

This mapping is illustrated by the diagram below, which has been chosen for its simplicity. Any other "recoverable" affinitized mapping can be used instead.

```
        512           512           512           512           512           512
   0123456789...F0123456789...F0123456789...F0123456789...F0123456789...F0123456789...F0123456789...
   FFFFFFFFFF...x1111111111111111111111111111111111111111112222222222223333333333........AAAAAAAAAA...
                                                                     512           512           512
                                                                F0123456789...F0123456789...F
                                                                xBBBBBBBBBB...xCCCCCCCCCC...x
```

In this diagram, the block frame (denoted by F) partially fills the first MTU-sized unit. The first slice (denoted by 'x') is padded. The first columnar slice (denoted by '1') starts at its primary mapping location and overflows into the next 2 stripes. Columnar slices for column 2 and column 3 (denoted by '2' and '3'), cannot start at their primary locations (already taken by column 1), so they sequentially follow. Somewhere in between column 3 and column 61 (denoted by 'A'), the padding and primary mapping become possible again, and the last 3 columns (61, 62, 63) map to their corresponding primary stripes and fit completely into the primary stripes.

This mapping of slices to MTU-sized stripes allows a very simple projection implementation in the flash controller. By looking at the 64 numbers in the block frame, flash controller can determine which of the MTU-sized slices are not needed by a given SMART scan, and avoid sending these unneeded stripes to the HOST.

It can be seen that this special block representation is a fully equivalent way to layout block data. In one embodiment, a high-speed conversion between the two representations is always possible if there is space in a block to keep 64 2-byte numbers. As previously mentioned, this space can be either reserved at insert time, or may just happen to exist in the block. In a rare case when an existing block does not have 128 free bytes (for example formatted/inserted into by the previous version of a database system), that exception block can be stored in its original format, and the fact that there is an exception can be indicated by a special bit in the block frame header. In one embodiment, a spare bit always exists in a 32K block to indicate exceptions.

In one embodiment, the memory controller receives a request for column data from a block of row data that is striped across a plurality of memory chips. The memory controller retrieves information, such as a minimum transfer unit of data, from the memory chips. The memory controller accesses a mapping stored in a block header of the retrieved information to determine that one or more portions of the data store the requested one or more columns. In one example, the one or more portions of the data were received from one or more memory chips but not one or more other memory chips, and one or more other portions of data were received from the one or more other memory chips. Based on the mapping, the memory controller filters out the one or more other portions of data and returns to a host device only those portions of data to which the requested one or more columns is mapped.

Technology-Dependent Striping

Technology-dependent mapping is an enhancement for the mapping explained above. In various embodiments, the techniques include:

1) achieving parallelism from all chips in a flash drive system for SMART Scans; and/or 2) reducing the number of MTUs that have to be moved between flash chips and flash controller.

In one embodiment, a flash drive employs some form of physical data striping across flash chips. In one example, "no striping" is considered as another special form of striping. In one embodiment, the number of stripes, their sizes and specific assignment of stripes to flash chips/LUNs/Interleaves is flash/vendor technology dependent. The number of stripes may be chosen based on optimal overall performance of a flash drive for a mixture of data access types.

In one embodiment, default mapping logic is on the memory controller. The default mapping logic maps one or more columns to logical units that are predicted to store data for the one or more columns. The default mapping logic may be supplemented by a corrective mapping retrieved from a memory chip that stores the block header. For example, the default mapping may have predicted one or more logical units that may store the requested columns, and the block header may indicate whether the columns are actually stored on the predicted one or more logical units. In one example, the block header stores column sizes to indicate whether the column data overflows from one logical unit to another logical unit.

In one embodiment, the striping is physio-logical, where the physical striping of data is not changed. In other words, if physical striping distributes 32K block data across a certain number of chips, in certain locations, then, in one embodiment, the physio-logical striping results the same stripes being used on the same set of flash chips. In one embodiment, unlike in the physical striping approach, the contents of the stripes are re-arranged to allow various read-time, SMART scan optimizations.

In one embodiment, the physio-logical striping has a certain advantage of simplicity over a more aggressive approach of changing the physical data striping, because physio-logical striping is generally never worse than a physical-only striping method. In one embodiment, a physical striping is chosen optimally. According to this embodiment, in the worst case, exactly the same set of stripes can be read in exactly the same order as without physio-logical striping, guaranteeing no degradation (but there is also no benefit in this case). Not every database access is a smart scan that can theoretically benefit from logical striping. Accordingly, various embodiments do not degrade non-smart-scan operations. Obeying physical stripe placement is one simple way to achieve this.

Physio-logical striping is illustrated by an example of a SMART Scan, accessing a 63 column table, similar to the above. In one embodiment, the physical striping chosen for the given flash/vendor technology distributes 32K of sequential data across 64 parallel units in the flash chips in a flash drive, one MTU per chip.

In this example, within one 32K database block, the mapping remains the same—frame, followed by C1, C2, etc., C63. For consecutive 32K database blocks, the mappings of columnar slices to MTUs is done with an induced "phase shift", as in the following diagram.

| Block #01: | F | 1 | 2 | 3 | 4 | ... | C |
| Block #02: | B | C | F | 1 | 2 | ... | A |
| Block #03: | . | A | B | C | F | 1 2 | . |
| ... | | | | | | | |
| Block #32: | 2 | 3 | 4 | 5 | ... | F | 1 |

As shown, 'F' denotes block frame slice mappings, numbers 1, 2, 3, 4, and 5 denote primary mappings of columnar slices 1, 2, 3, etc, and letters A, B, and C denote primary mappings of columnar slices 61, 62, and 63 correspondingly. In one embodiment, columns of the table correspond to the 64 flash chips, and the MTUs within a column reside sequentially within a chip.

In the example, for the next set of 32 blocks, the induced shift pattern repeats, similar to the first set of 32 32K blocks. The induced phase shift value is used to distribute every primary column MTU over all parallel chips (LUNs). This physio-logical striping example allows for various read time optimizations that are technology dependent.

An example SMART scan accessing column #1, processing of 1 MB of sequential data blocks (32 32K blocks) proceeds in the following manner. On the first step of the algorithm, primary 32 block frame stripes are transferred from 32 different flash chips in parallel (the phase shifted striping guarantees that block frames are mapped to different chips). At the same time, the other 32 chips are transferring primary MTUs for the required column 1.

In one embodiment, if the column 1 resides completely on the primary slices, as can be determined by looking at the combined column lengths in the block frame slices, the read algorithm terminates after the first step. In this example, columnar striping technique reduces the amount of data moved between flash chips and flash controller by 32×.

In one embodiment, if the column overflows into secondary overflow slices, the read continues until all the overflow slices are retrieved. The retrieved data is sent to the host. In the overflow example, the reduction in the amount of data moved between flash chips and flash controller is less than 32×, but can still easily be in the orders of magnitude. For example, if the overflows are only single overflows, then a 16× reduction may be achieved in the amount of data transferred between flash chips and flash controller, instead of 32× in the other example.

In the example, depending on what stripes need to be retrieved and how the required columns map to their primary stripes, the columnar striping technique may result in performance improvement ratio between 1.0 (no improvement) to 32×, if the local bus between flash chips and flash controller is a bottleneck.

In one embodiment, if the above SMART Scan read optimization is not applicable to a given flash technology (e.g. because of latency being too large), a different optimization based on MAX column sizes is used. Sometimes, column sizes are known exactly as is the case with, for example, Oracle DATE, native float/double and fixed char (for example, char(3)) columns. In that case, for a SMART scan accessing, for example, columns 1-10 in a 63 column table, knowing combined MAX length on the first 10 columns may allow to restrict a subset of MTUs needed by the scan. A different phase shifting strategy can be used in this case, optimizing MTU layout across chips for that technology, for prefix SMART scans with MTU restriction based on MAX column sizes.

In the 64 parallel chip/512 byte striping example, a phase shift of 16 MTUs may be done after every 4 blocks, as shown.

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| Block #01: | F | 1 | 2 | 3 | 4 | 5 | 6 | 7 | 8 | 9 | 0 | 1 | 2 | 3 | 4 | 5 | | 6 | 7 | 8 | 9 | 0 | 1 | 2 | 3 | 4 | 5 | 6 7 8 9 0 ... C |
| Block #02: | F | 1 | 2 | 3 | 4 | 5 | 6 | 7 | 8 | 9 | 0 | 1 | 2 | 3 | 4 | 5 | | 6 | 7 | 8 | 9 | 0 | 1 | 2 | 3 | 4 | 5 | 6 7 8 9 0 ... C |
| Block #03: | F | 1 | 2 | 3 | 4 | 5 | 6 | 7 | 8 | 9 | 0 | 1 | 2 | 3 | 4 | 5 | | 6 | 7 | 8 | 9 | 0 | 1 | 2 | 3 | 4 | 5 | 6 7 8 9 0 ... C |
| Block #04: | F | 1 | 2 | 3 | 4 | 5 | 6 | 7 | 8 | 9 | 0 | 1 | 2 | 3 | 4 | 5 | | 6 | 7 | 8 | 9 | 0 | 1 | 2 | 3 | 4 | 5 | 6 7 8 9 0 ... C |
| Block #05: | . | | | | | | | | | | | | | | | | C | F | 1 | 2 | 3 | 4 | 5 | 6 | 7 | 8 | 9 | 0 1 2 3 4 ... X |
| Block #06: | . | | | | | | | | | | | | | | | | C | F | 1 | 2 | 3 | 4 | 5 | 6 | 7 | 8 | 9 | 0 1 2 3 4 ... X |
| Block #07: | . | | | | | | | | | | | | | | | | C | F | 1 | 2 | 3 | 4 | 5 | 6 | 7 | 8 | 9 | 0 1 2 3 4 ... X |
| Block #08: | . | | | | | | | | | | | | | | | | C | F | 1 | 2 | 3 | 4 | 5 | 6 | 7 | 8 | 9 | 0 1 2 3 4 ... X |

...

The phase shifting example increases sequential transfer lengths from every flash chip, reducing MTU access latencies in this case. In one embodiment, the phase shifting example reaps the benefits of flash chip parallelism.

Returning a subset of MTUs from the flash controller to HOST means that the database system has to deal with "partial" blocks formed by subsets of MTUs. This leaves several options. In one option, the subset of MTUs is re-combined into a partial Row-Major block, before the block is given to the relational database management system for further processing. In another option, the relational database management system deals with columnar MTUs directly, optionally utilizing vectorized columnar processing techniques.

In the former case of MTU recombination, in one embodiment, the flash controller itself is programmed or otherwise logically configured to perform the MTU recombination. The MTU recombination may also be done in the HOST CPU, or split between flash controller and HOST CPU as most appropriate.

In one embodiment, block transformation from the Row Store format into the affinitized-columnar MTUs is done in the HOST CPU mostly, with flash controller exposing just the necessary information to the HOST to do that—such as MTU size and physical striping across flash chips. In another embodiment, block transformation from the Row Store format into the affinitized-columnar MTUs is done entirely in the flash controller, or split as appropriate between the HOST CPU and the flash controller.

Work partitioning options between the flash controller and HOST CPU have various pros and cons. Doing more work in the HOST CPU can translate into a visible CPU overhead on the host. On the other hand, flash controller can be harder to program and upgrade than the HOST.

In one embodiment, supporting SMART Scan in the flash controller involves the use of Storage Bus command extensions. Most storage command systems reserve some mechanism to implement vendor/application specific commands.

One scheme to implement vendor specific commands is to reserve a range of block addresses, for example high addresses beyond drive capacity, for vendor/application specific communication. In one embodiment, this scheme is universally applicable to all storage protocols. Writes to the special block addresses by the HOST can be interpreted as vendor specific commands by the flash controller, and reads from these addresses by the HOST can be interpreted as smart scan read requests by the flash controller.

Responding to Requests for Data

In one embodiment, the memory controller receives a request for column data from a block of row data that is striped across a plurality of memory chips. For example, the request may include a command that selects one or more columns of data from a data block of row data. In another example, the request includes metadata that specifies the columns requested without specifying the operations to be performed on the columns. The memory controller accesses a mapping to determine that one or more memory devices, which may be identified in terms of memory chips themselves or logical units of the memory chips, store the requested column data.

In one embodiment, the memory controller accesses an MTU of data in parallel from a memory device that is deterministically mapped to a block header and one or more memory devices predicted to hold the requested column data. The block header is read to determine whether the entirety of the requested column data is stored in the information retrieved from the memory device predicted to hold the requested column data. If the entirety of the requested column data is stored in the information retrieved from the memory device predicted to hold the requested column data, then the memory controller returns the requested column data to the host device without retrieving or returning other data from other memory devices.

If the block header indicates that the requested column data overflows onto one or more other memory devices, then the memory controller retrieves the remainder of the requested column data from one or more other memory devices. In one embodiment, the memory controller assembles the requested column data from multiple memory devices and returns the requested column data to the host device without retrieving or returning other data from other memory devices other than those predicted or known to store the requested column of data.

Hardware Overview

According to one embodiment, the techniques described herein are implemented by or in conjunction with one or more special-purpose computing devices. In one example, a flash memory module is a storage device that is configured to send data to and receive data and commands from a HOST computing device. The HOST computing device is configured to send data storage commands and data retrieval commands to the flash memory module. The special-purpose computing devices may be hard-wired to perform the techniques, or may include digital electronic devices such as one or more application-specific integrated circuits (ASICs) or field programmable gate arrays (FPGAs) that are persistently programmed and/or may be re-programmed on the fly to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement or utilize the techniques.

Figure 4:
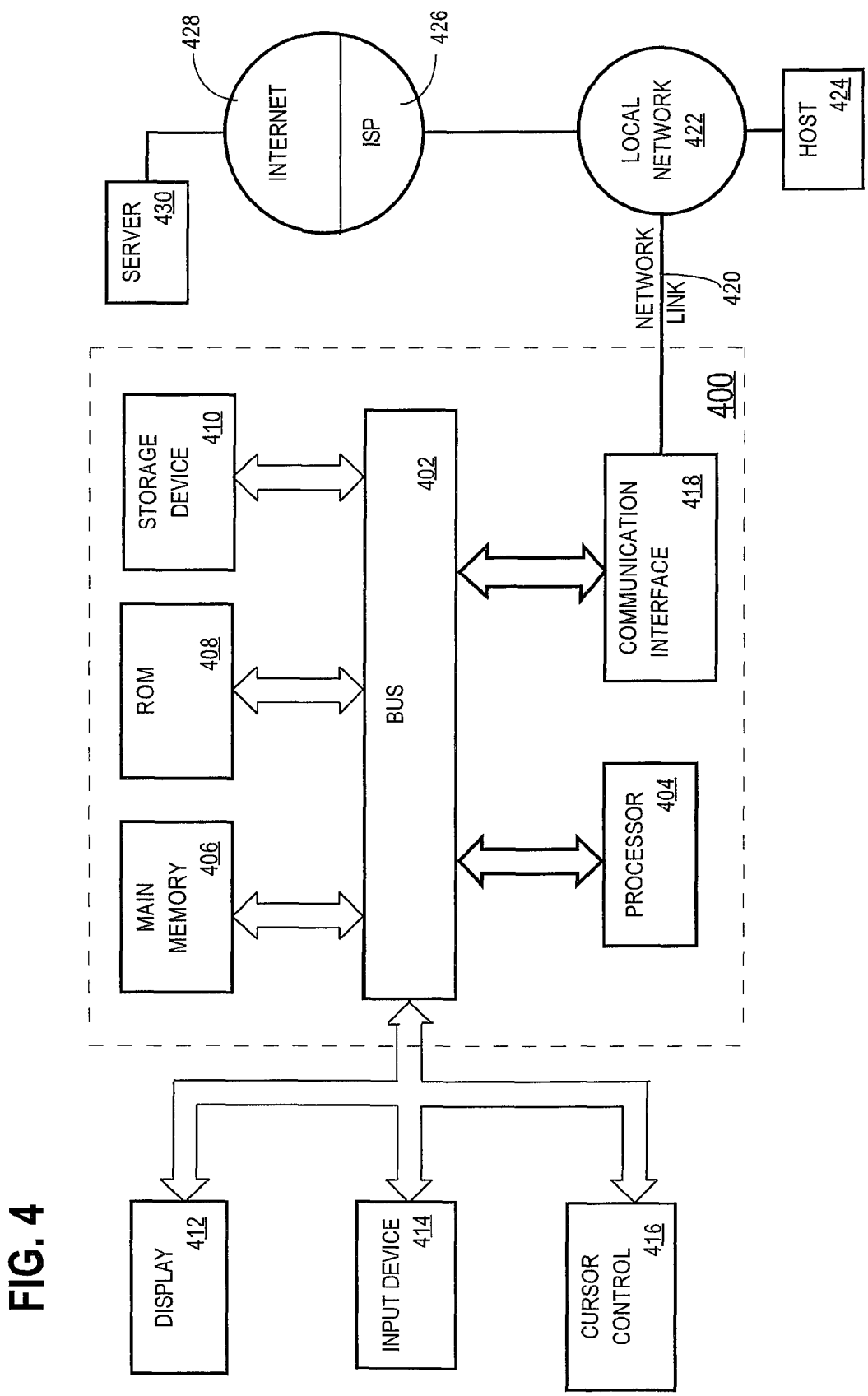
FIG. 4 illustrates an example computer system that can be used in conjunction with the techniques described herein.

For example, FIG. 4 is a block diagram that illustrates a computer system 400. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are used by computer system 400 in response to processor 404 executing one or more sequences of one or more instructions contained in main memory 406 to cause computer system 400 to send commands to a flash memory module. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical disks, magnetic disks, or a flash memory module, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A memory device comprising:
a memory controller; and
a plurality of memory chips;
the memory controller configured to receive, from a computing device, a request for data that is stored in one or more data blocks that are striped across the plurality of memory chips, wherein each data block stores a set of rows, wherein each memory chip of the plurality of memory chips is a non-volatile random access memory device;
the memory controller configured to determine that the request is for columnar data stored in one or more columns in said set of rows; and
the memory controller configured to perform, for each data block of the one or more data blocks:
using mapping logic for said each data block that maps each column of said one or more columns to one or more striped portions of the data block,
based on the mapping logic, selecting one or more memory chips of the plurality of memory chips that store the one or more striped portions to which the one or more columns are mapped;
retrieving the one or more striped portions from the one or more memory chips without retrieving one or more other striped portions of the data block from one or more other memory chips of the plurality of memory chips, wherein the one or more other striped portions of the data block are mapped to by one or more other columns; and
returning, to the computing device, the columnar data from the one or more striped portions of the data block.

2. The memory device of claim 1, wherein the mapping logic comprises a default mapping and a corrective mapping, wherein the default mapping maps a particular column of the one or more columns to a first striped portion of the one or more striped portions, and wherein a first memory chip of the one or more memory chips stores the first striped portion, the memory controller further configured to perform:
determining, from the corrective mapping, that the one or more columns overflow onto a second striped portion of the one or more striped portions; and
retrieving the second striped portion from a second memory chip that stores the second striped portion;
wherein the one or more other striped portions of the data block are striped portions other than both the first striped portion and the second striped portion, wherein the one or more other memory chips are memory chips other than both the first memory chip and the second memory chip, and wherein the one or more other columns are columns other than the particular column.

3. The memory device of claim 1, wherein each striped portion of the one or more striped portions is stored in a logical unit of storage on the one or more memory chips of the plurality of memory chips.

4. The memory device of claim 3, wherein each logical unit of storage is of a size that is based on a Minimum Transfer Unit (MTU) between the plurality of memory chips and the memory controller.

5. The memory device of claim 1, wherein the mapping logic comprises a default mapping on the memory controller that maps a particular column of the one or more columns to a particular striped portion of the one or more striped portions.

6. The memory device of claim 1, wherein the mapping logic comprises a default mapping and a corrective mapping, and wherein the memory controller is further configured to perform retrieving the corrective mapping from a particular memory device that stores a block header.

7. The memory device of claim 1, wherein the mapping logic comprises a default mapping on the memory controller that maps a particular column of the one or more columns to a particular striped portion of the one or more striped portions, the memory controller further configured to perform retrieving a block header from a first memory chip that stores the block header, and wherein the mapping logic further comprises a corrective mapping in the block header that indicates the one or more columns fit on the particular striped portion.

8. A memory device comprising:
a memory controller;
a plurality of memory chips;
the memory controller configured to receive a request, from a computing device, for data that is stored in one or more data blocks that are striped across a plurality of memory devices, wherein each of the one or more data blocks stores a set of rows, wherein each memory device of said plurality of memory devices is a non-volatile random access memory device;
the memory controller configured to determine that the request is for columnar data stored in one or more columns in said set of rows; and
the memory controller configured to perform, for each data block of the one or more data blocks:
retrieving from each of the plurality of memory devices a striped portion of the said data block,
using mapping logic for the data block that maps each column of said one or more columns to one or more striped portions of the data block,
based on the mapping logic, extracting the one or more striped portions from the retrieved striped portions of the data block, and
returning, to the computing device, the columnar data from the one or more striped portions of the data block without returning one or more other striped portions of the retrieved striped portions of the data block.

9. The memory device of claim 8, wherein each of the striped portions is stored in a logical unit of storage on a memory chip of the plurality of memory chips.

10. The memory device of claim 8, wherein each logical unit of storage is of a size that is based on a Minimum Transfer Unit (MTU) between the plurality of memory chips and the memory controller.

11. The memory device of claim 8, wherein a particular striped portion of the retrieved striped portions includes a block header, wherein the mapping logic comprises a mapping that is stored in the block header.

12. A method comprising:
a memory controller receiving, from a computing device, a request for data that is stored in one or more data blocks that are striped across a plurality of memory devices, wherein each data block stores a set of rows, wherein each memory device of said memory devices is a non-volatile random access memory device;

determining that the request is for columnar data stored in one or more columns in said set of rows; and for each data block of the one or more data blocks:

using mapping logic for said each data block that maps each column of said one or more columns to one or more striped portions of the data block, based on the mapping logic, selecting one or more memory devices of the plurality of memory devices that store the one or more striped portions to which the one or more columns are mapped;

retrieving the one or more striped portions from the one or more memory devices without retrieving one or more other striped portions of the data block from one or more other memory devices of the plurality of memory devices, wherein the one or more other striped portions of the data block are mapped to by one or more other columns; and returning, to the computing device, the columnar data from the one or more striped portions of the data block.

13. The method of claim 12, wherein the mapping logic comprises a default mapping and a corrective mapping, wherein the default mapping maps a particular column of the one or more columns to a first striped portion of the one or more striped portions, and wherein a first memory device of the one or more memory devices stores the first striped portion, further comprising:

determining, from the corrective mapping, that the one or more columns overflow onto a second striped portion of the one or more striped portions; and retrieving the second striped portion from a second memory device that stores the second striped portion;

wherein the one or more other striped portions of the data block are striped portions other than both the first striped portion and the second striped portion, wherein the one or more other memory devices are memory devices other than both the first memory device and the second memory device, and wherein the one or more other columns are columns other than the particular column.

14. The method of claim 12, wherein each striped portion of the one or more striped portions is stored in a logical unit of storage on the one or more memory devices of the plurality of memory devices.

15. The method of claim 14, wherein each logical unit of storage is of a size that is based on a Minimum Transfer Unit (MTU) between the one or more memory devices and the memory controller.

16. The method of claim 12, wherein the mapping logic comprises a default mapping and a corrective mapping, the method further comprising retrieving the corrective mapping from a particular memory device that stores a block header.

17. The method of claim 12, wherein the mapping logic comprises a default mapping on the memory controller that maps a particular column of the one or more columns to a particular striped portion of the one or more striped portions, further comprising retrieving a block header from a first memory chip that stores the block header, and wherein the mapping logic further comprises a corrective mapping in the block header that indicates the one or more columns fit on the particular striped portion.

18. A method comprising:

a memory controller receiving a request, from a computing device, for data that is stored in one or more data blocks that are striped across a plurality of memory devices, wherein each of the one or more data blocks stores a set of rows, wherein each memory device of said plurality of memory devices is a non-volatile random access memory device;

determining that the request is for columnar data stored in one or more columns in said set of rows; and for each data block of the one or more data blocks:

retrieving from each of the plurality of memory devices a striped portion of the said data block, using mapping logic for the data block that maps each column of said one or more columns to one or more striped portions of the data block, based on the mapping logic, extracting the one or more striped portions from the retrieved striped portions of the data block, and returning, to the computing device, the columnar data from the one or more striped portions of the data block without returning one or more other striped portions of the retrieved striped portions of the data block.

19. The method of claim 18, wherein each striped portion of the striped portions is stored in a logical unit of storage on the plurality of memory devices.

20. The method of claim 18, wherein a particular striped portion of the retrieved striped portions includes a block header, wherein the mapping logic comprises a mapping that is stored in the block header.

* * * * *

UNITED STATES PATENT AND TRADEMARK OFFICE
CERTIFICATE OF CORRECTION

PATENT NO. : 8,296,517 B2
APPLICATION NO. : 12/859184
DATED : October 23, 2012
INVENTOR(S) : Potapov et al.

It is certified that error appears in the above-identified patent and that said Letters Patent is hereby corrected as shown below:

On Cover page, in column 1, under "Inventors", line 1, delete "Emeral Hills," and insert -- Emerald Hills, --, therefor.

In column 1, line 7, delete "Application." and insert -- Application --, therefor.

In column 5, line 33, delete ""chattinness"" and insert -- "chattiness" --, therefor.

Signed and Sealed this
Eighth Day of January, 2013

David J. Kappos
*Director of the United States Patent and Trademark Office*